Aug. 26, 1969  L. J. FANCHER  3,462,835
GLASSCUTTER WITH PLASTIC WHEEL RETAINING INSERT
Filed Feb. 17, 1967
FIG. 1
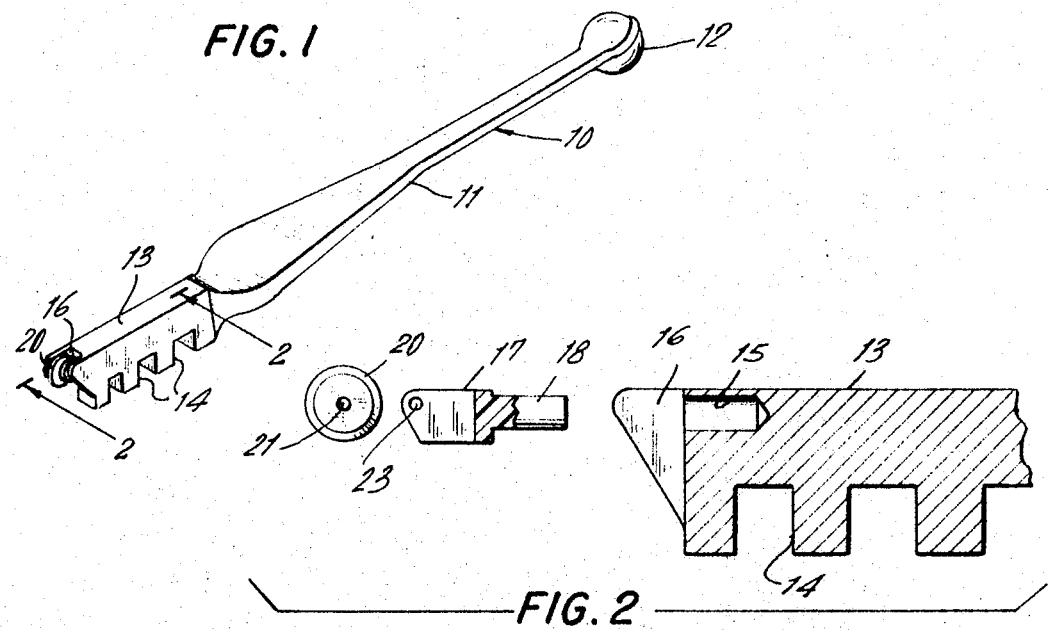
FIG. 2
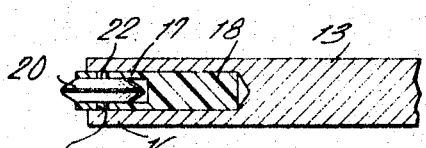
FIG. 3
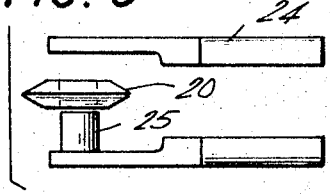
FIG. 5
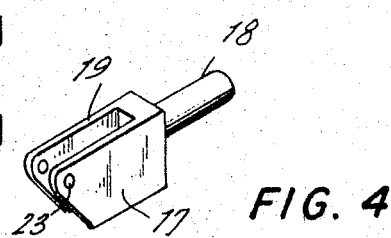
FIG. 4
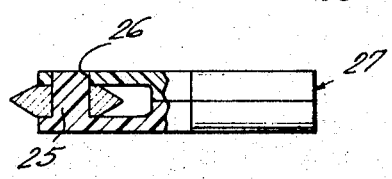
FIG. 6
INVENTOR.
LELAND J. FANCHER
BY Albert F. Kornman
ATTORNEY

United States Patent Office 3,462,835
Patented Aug. 26, 1969

3,462,835
GLASSCUTTER WITH PLASTIC WHEEL
RETAINING INSERT
Leland J. Fancher, Mountain Lakes, N.J., assignor to Red
Devil Inc., Union, N.J., a corporation of New Jersey
Filed Feb. 17, 1967, Ser. No. 616,808
Int. Cl. B23d 21/06; B26b 25/00
U.S. Cl. 30—164.95                                    1 Claim

ABSTRACT OF THE DISCLOSURE

A hand tool for cutting glass with an insert of low friction plastic carried by the handle, the circular glass cutting wheel being journaled within and supported by the insert.

Background of the invention

This invention relates to a hand held tool for cutting glass and more particularly to a tool in which a small wheel shaped cutter is employed for scribing a cut in a sheet of glass so that the glass may thereafter be broken along the scribed cut. Previously known glasscutters of the hand tool type, consisted of a short handle, a head either attached to or integral with the handle and a small wheel-like cutting tool journaled within a slot in the end of the head portion. The cutting wheel was supported by a transverse axle member which was usually made of metal and was carried by the head portion of the tool. Such prior art glasscutters work well providing that the cutting wheel rotated freely upon the axle. It was important that the wheel and axle be oiled so that this free motion was provided. In addition, a suitable clearance had to be provided between the cutting wheel and sides of the slot within which it was carried to prevent binding of the wheel within the slot with a resultant failure of operation. Foreign material could get in between the wheel and the head of the glasscutter and prevent the wheel from turning.

Summary of the invention

The present invention employs an insert of low friction plastic material carried by the head of the glasscutter and slotted to receive the cutting wheel therein. The cutting wheel may be journaled upon a metal or plastic axle and little or no clearance is required between the sides of the cutting wheel and the insert.

The invention consists of the construction, combination and arrangement of parts as herein illustrated described and claimed.

In the accompanying drawing, forming a part hereof is illustrated two forms of embodiment of the invention, in which drawing, similar reference characters designate corresponding parts and in which:

FIGURE 1 is a somewhat isometric view of a glasscutter made in accordance with the present invention, FIGURE 2 is a fragmentary exploded view partly in section, on an enlarged scale, of the glasscutter shown in FIGURE 1 taken on line 2—2 of that figure, FIGURE 3 is a fragmentary view in horizontal section on an enlarged scale of the cutting head of the glasscutter shown in FIGURE 1, FIGURE 4 is a somewhat isometric view of the plastic insert employed in the present invention, FIGURE 5 is a somewhat exploded view of a second form of plastic insert used in the present invention, FIGURE 6 is a plan view partially broken away of the insert shown in FIGURE 5 in the assembled condition.

Referring to the drawing and particulary to FIGURE 1, 10 indicates a glasscutter having an elongated flattened handle 11 and a somewhat ball shaped portion 12 at one end thereof. The ball shaped portion 12 may be employed for tapping the glass after a cut has been made therein for the purpose of breaking the glass, in the well-known manner.

A cutting head 13 is formed integral with the opposite end of the handle 11 and may be provided with the usual transverse cuts 14 for glass breaking purposes. The transverse slots 14 and ball shaped handle portion 12 are well known in the art and do not constitute part of the present invention.

As shown in FIGURE 2, the cutting head 13 is provided with a bore 15 in the end thereof and is slotted as indicated at 16 along its longitudinal axis. A plastic insert 17, best shown in FIGURES 2 and 4, is received within the slot 16 and bore 15. The insert 17 is formed with an integral pin 18 which is substantially cylindrical and can be press-fitted into the bore 15. The remainder of the plastic insert is bifurcated as indicated at 19 to receive therebetween a cutting wheel 20. The plastic insert is preferably made of a superpolymeric amide sold under the trademark Nylon, a polyoxymethylene thermoplastic resin sold under the trademark Delrin, or a combination of Delrin and tetrafluoroethylene sold under the trademark Teflon, or some other similar low friction material. The cutting wheel may be of carbide or any other material capable of cutting glass.

The cutting wheel 20 is transversely bored as indicated at 21 in FIGURE 2. An axle member 22 is supported at each end by small bores 23 in the plastic insert 17. The axle 22 is slipped through the bore 21 in the cutting wheel 20 and the cutting wheel turns freely upon the axle.

The axle 22 may be made of carbide, bronze, or some other suitable metal. Alternately, plastic axles made of Nylon, Delrin, Delrin-Teflon or the like may be used for this purpose.

As shown in FIGURE 3 the assembled cutting wheel 20 and plastic insert 17 provides substantially no clearance between the sides of the cutting wheel and the insert. Nevertheless, the wheel will turn freely by reason of the anti-friction properties of the plastic employed. Lubrication of the wheel and axle is thus unnecessary and foreign matter less likely to find its way between the wheel and the sides of the slot in the glasscutter adjacent thereto.

Referring to FIGURES 5 and 6 there is shown still another embodiment of the present invention in which the insert 24 is made in two parts, one of which has moulded thereon an axle member 25. A small socket or bore 26 is formed in the other half of the insert 24 to receive the free end of the axle 25. The cutting wheel 20 is slipped upon the axle 25 and the plastic insert assembled as shown in FIGURE 6.

When the plastic insert 24 is assembled in the manner shown in FIGURE 6, the cylindrical pin 27 is press-fitted into the bore 15 of the cutting head 13 as described above. The sides of the slot 16 in the cutting head support the sides of the insert 17 and prevent the wheel from skewing as the cutting operation is carried out.

From the foregoing it will be seen that there has been provided a glasscutter which will operate with relatively little attention for a long period of time and which will prevent binding of the cutting wheel within the cutting head despite failure to lubricate the moving parts.

Having thus fully described the invention, what is claimed as new and desired to be secured by Letters Patent of the United States, is:

1. A glasscutter having an elongated handle portion, a longitudinally slotted and bored head on one end of the handle, a plastic insert of anti-friction material received within the head slot and bore, said insert being in the form of two complementary longitudinally slotted sections, one of said sections having a cutting wheel receiving axle of anti-friction material formed integral therewith and extending into the insert slot and the other of said section having a bore therein to receive the free end of said axle, said insert having a substantially cylindrical pin extending therefrom into the handle bore, and a glass cutting wheel journaled upon the axle within the insert slot and laterally supported by the insert.

References Cited

UNITED STATES PATENTS

| | | | |
|---|---|---|---|
| 2,096,284 | 10/1937 | Lee | 30—164.95 |
| 2,529,735 | 11/1950 | Martin | 30—164.95 |
| 3,106,018 | 10/1963 | Judd | 30—164.95 |
| 3,221,405 | 12/1965 | Bohle | 30—164.95 |

FOREIGN PATENTS 1,145,562   5/1957   France.

ROBERT C. RIORDON, Primary Examiner

R. V. PARKER, JR., Assistant Examiner

U.S. Cl. X.R.

30—101, 365